Figure 3:
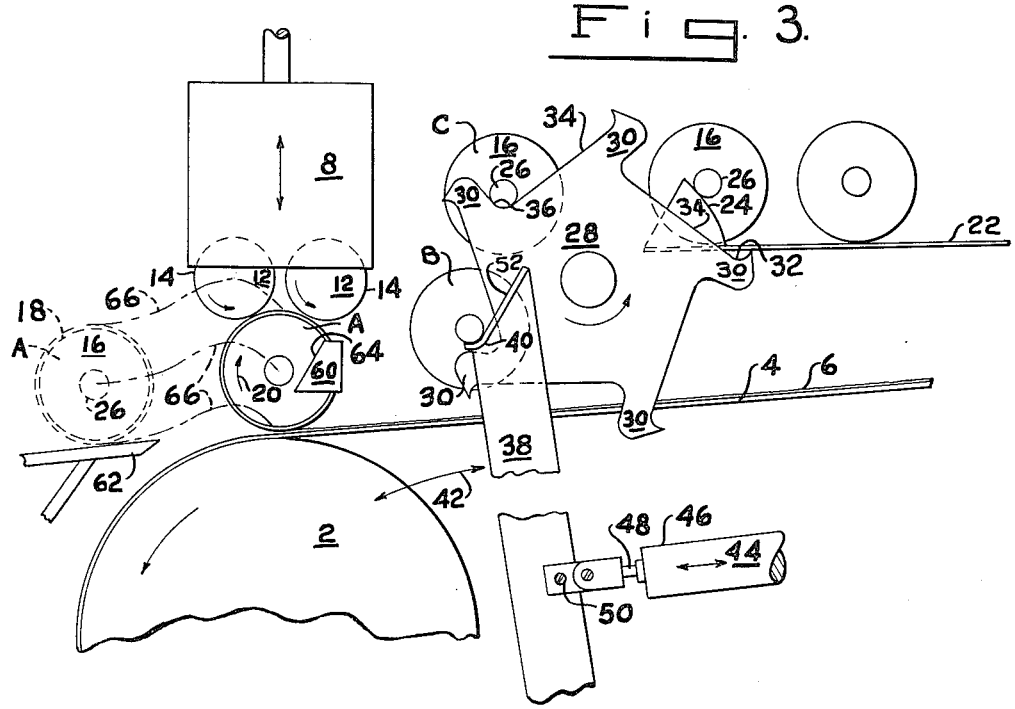

May 10, 1966 W. W. BAGWELL 3,250,669
APPARATUS FOR THE MANUFACTURE OF ASBESTOS-CEMENT TUBES
Original Filed Dec. 28, 1962 3 Sheets-Sheet 1
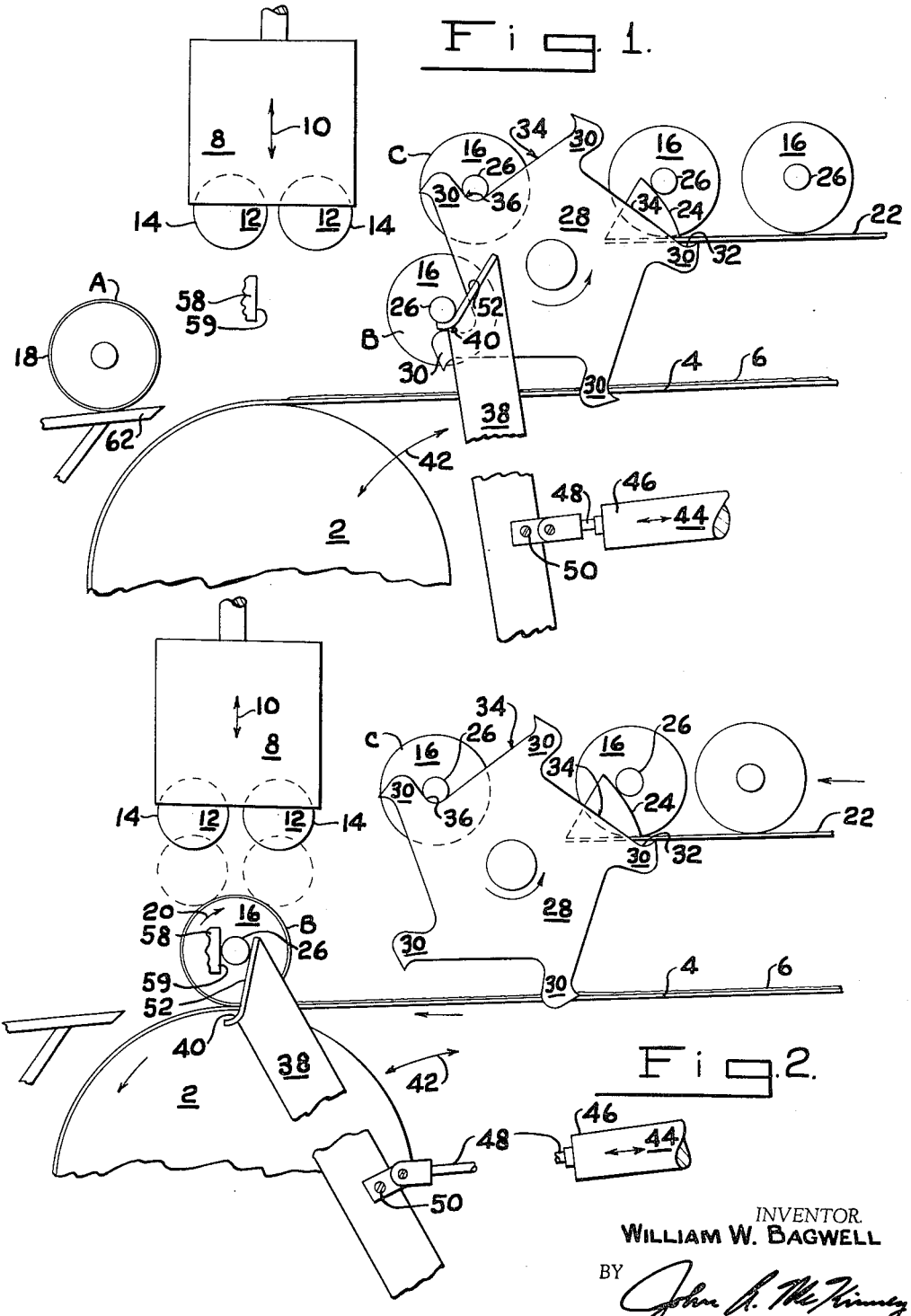
INVENTOR.
WILLIAM W. BAGWELL
BY
ATTORNEY May 10, 1966 W. W. BAGWELL 3,250,669
APPARATUS FOR THE MANUFACTURE OF ASBESTOS-CEMENT TUBES
Original Filed Dec. 28, 1962 3 Sheets-Sheet 2

INVENTOR.
WILLIAM W. BAGWELL
BY
ATTORNEY

United States Patent Office 3,250,669
Patented May 10, 1966

3,250,669
APPARATUS FOR THE MANUFACTURE OF ASBESTOS-CEMENT TUBES
William W. Bagwell, Denison, Tex., assignor to Johns-Manville Corporation, New York, N.Y., a corporation of New York
Continuation of abandoned application Ser. No. 247,932, Dec. 28, 1962. This application Apr. 30, 1965, Ser. No. 458,807
4 Claims. (Cl. 162—284)

This application is a continuation of my copending application Serial No. 247,932, filed December 28, 1962, and now abandoned.

This invention relates to apparatus for use in forming asbestos-cement products and is particularly directed to apparatus for use in the formation of asbestos-cement pipe and for effecting a separation of the asbestos-cement stock in the manufacture of asbestos-cement pipe utilizing a process wherein wet asbestos-cement stock is collected on a rotating mandrel.

In the manufacture of asbestos-cement products and in particular the manufacture of asbestos-cement pipe utilizing a system such as that described in Swensen, U.S. Patent No. 3,000,776, and Rembert, U.S. Patent No. 2,322,592, a felt is arranged to pick up a wet asbestos-cement stock which is then collected on a rotating mandrel. One of the problems involved in the manufacture of asbestos-cement pipe in a system as disclosed above resides in the moving of a mandrel into and out of pipe forming position in the pipe forming apparatus. In the systems illustrated in Swensen and Rembert, it is necessary to stop the movement of the felt carrying the layer of wet asbestos-cement stock in order to effect a change of the mandrels. Therefore, it is essential in a system of this nature that the mandrels be changed as rapidly as possible to minimize the stoppage time of the felt. Also, when a wall thickness of a predetermined amount has been built up on the rotating mandrel, it is necessary to effect a separation of the stock between the felt and the mandrel. Many difficulties have been encountered in obtaining a clean separation of the stock between the felt and the mandrel in the manufacture of asbestos-cement products so that the mandrel with the formed stock thereon can be removed for further processing.

It is an object of the instant invention to provide apparatus for effecting a separation of the asbestos-cement stock between the felt and the mandrel in the manufacture of asbestos-cement products.

It is a further object of the instant invention to provide apparatus for moving a mandrel out of and into pipe forming position in the manufacture of asbestos-cement pipe.

The foregoing objects are accomplished in accordance with the instant invention by a combination of elements which cooperate to move the mandrels out of and into pipe forming position while at the same time effecting a separation of the asbestos-cement stock between the felt and the mandrel in the manufacture of asbestos-cement pipe. In the preferred embodiment of the instant invention, a plurality of mandrels are positioned on an inclined conveyor and are moved from this conveyor in sequence by an indexing mechanism which transposes each mandrel from a position adjacent the discharge end of the inclined conveyor to a position in the notch of each of a pair of cooperating pivoted arms. After an empty mandrel has been positioned in the pivoted arms, these arms are actuated to move the empty mandrel into pipe forming position on the anvil roll of a pipe forming machine. The empty mandrel is held in position on the anvil roll between a fixed abutment and one edge of the pivoted arm. An upper press mechanism is lowered until the empty mandrel is in position to be retained in a rotatable position and an asbestos-cement pipe is formed on the mandrel by laminating asbestos-cement stock from the felt on to the rotating mandrel. After the formation of the pipe on the mandrel is initiated, the pivoted arms are returned to position adjacent the indexing mechanism. When the asbestos-cement stock on the mandrel has reached a desired wall thickness, the forming operation is stopped and the press rolls are raised. Means are then initiated to impart to the mandrel with the asbestos-cement stock thereon a linear and a rotational movement so as to move the mandrel from the pipe forming position and at the same time to effect a separation of the stock between that on the felt and that on the mandrel. The mandrel with the asbestos-cement stock formed thereon is then moved by suitable mechanisms for further processing.

Figure 4:
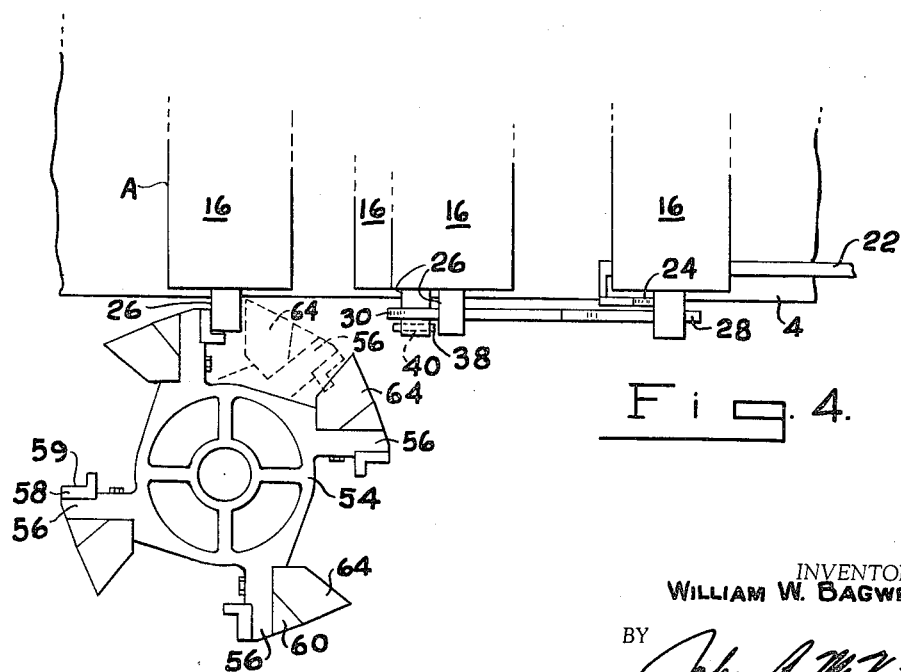
Figure 5:
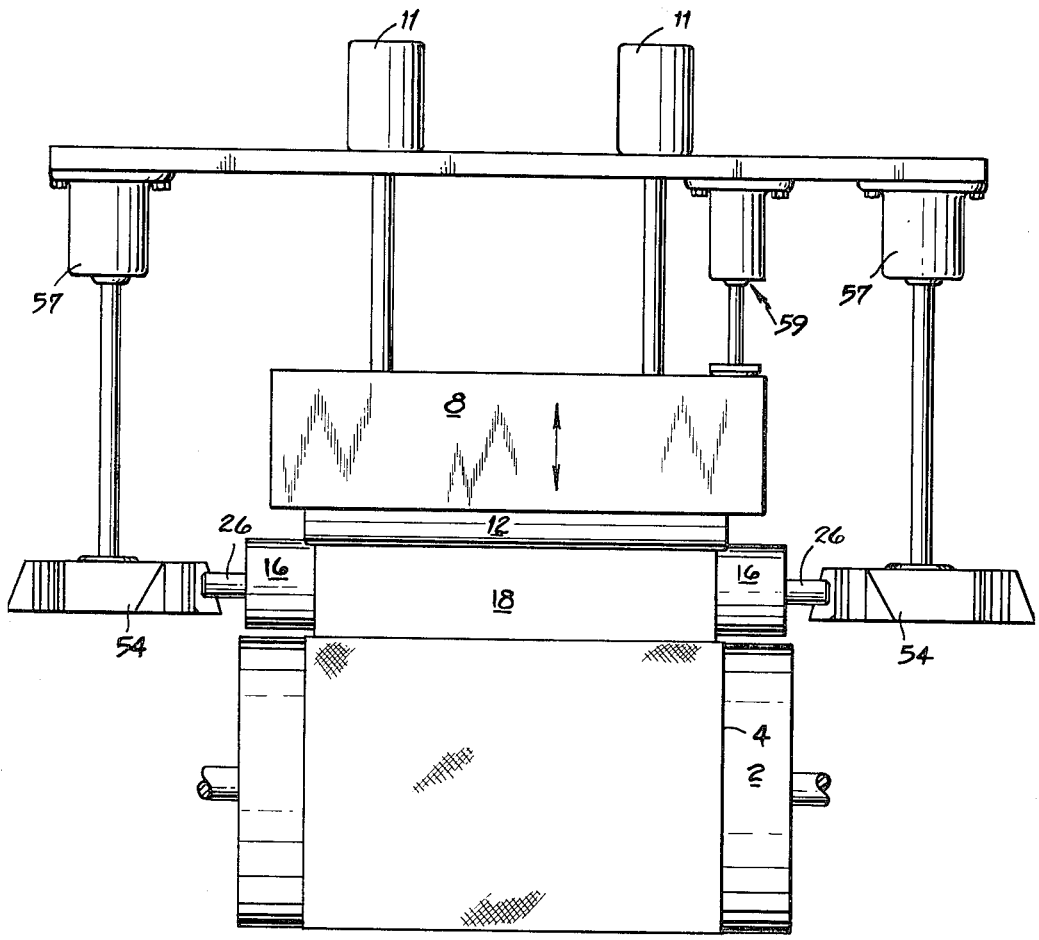

The invention will be more fully understood and further objects and advantages thereof will become apparent when reference is made to the following detailed description of a preferred embodiment of the invention and the accompanying drawings in which:

FIGS. 1–3, inclusive, illustrate different positions of portions of the apparatus of the instant invention during the formation of pipe;

FIG. 4 is a top plan view illustrating a portion of the apparatus of the instant invention; and FIG. 5 is a front elevation of a portion of the apparatus of the instant invention.

Referring to the drawing, there is illustrated in FIGS. 1–3, inclusive, an anvil roll 2 over which there travels a felt 4 arranged to pick up a wet-laid stock 6 from a cylinder mold (not shown) of a conventional machine of the type shown in the aforesaid Rembert patent. The anvil roll 2 is a rigid element capable of withstanding pipe forming pressures without flexing, and is rotated by a conventional means (not shown) to drive the felt 4 in the direction of the arrow. Positioned above the anvil roll is an upper press section, generally designated 8, moving toward and away from the anvil roll 2 in the directions indicated by the arrow 10 by means 11. The press section 8 comprises a pair of rotatably mounted press rolls 12 having a peripheral surface 14 formed from a resilient material such as neoprene or other rubber-like material preferably of a hardness in the order of 55 durometer. As illustrated in FIG. 2, a mandrel 16 is positioned between the press rolls 12 and the anvil roll 2 and rotated in a direction indicated by the arrows 20. As the mandrel 16 is rotated, an asbestos-cement pipe 18 is formed on the peripheral surface thereof from the wet asbestos-cement stock 6 carried by the felt 4.

In FIGS. 1–3, inclusive, there is also illustrated the system for moving the mandrels out of and into position between the press rolls 12 and the anvil roll 2. A plurality of mandrels 16 are placed on an accumulation rack 22 comprising a pair of spaced cooperating rails by conveyor mechanism (not shown) and rolled to a position against the stop 24 through gravity feed. Each of the mandrels 16 has a central stub shaft 26 which is contacted by the stop members 24 on each side of the accumulation rack 22. Adjacent to the end of the accumulation rack 22 and the stop 24, there are mounted a pair of rotatably mounted indexing mechanisms 28 (only one being illustrated in the drawing). Each indexing mechanism 28 has a plurality of radially extending arms 30 at spaced intervals about the periphery thereof. Each arm 30 has a leading surface, in the direction of rotation of the indexing mechanism 28, which is adapted to contact the stub 26 of the mandrel 16 which then nests in the portion 32 so as to lift the mandrel from the accumulation rack 22. Between each of the arms 30 the index mechanism 28 is provided with a surface 34 over which the mandrel 16 and principally the stub shaft 26 moves during the rotation of the indexing mechanism 28. Each arm 30 is further provided with a trailing surface having a portion 36 adopted to receive the stub shaft 26 of the mandrel 16 after it has rolled over the portion 34. The indexing mechanisms 28 are synchronized so as to move simultaneously. As the indexing mechanisms 28 continue to rotate, the arms 30 thereof pass between a pair of pivoted members 38. Each of the members 38 is provided with a notched portion 40 for receiving the stub shaft 26 of the mandrel 16. The pivoted member 38 is actuated in a direction indicated by the arrows 42 by a conventional hydraulic mechanism 44 comprising a cylinder 46 and a piston 48 and operated by conventional hydraulic lines (not shown). The pivoted member 38 is connected to the piston 48 by a pivot arrangement 50.

In FIG. 4, there is illustrated part of the mechanism for providing a fixed abutment against which the empty mandrel is positioned prior to the pipe forming operation between the press rolls and the anvil roll. Also, this mechanism functions to remove the mandrel from the pipe forming position after the asbestos-cement pipe has been formed thereon and to effect a separation of the stock between that on the felt and that on the mandrel. This mechanism comprises a pair of star wheels positioned on opposite sides of the pipe forming machine. In the preferred embodiment of the invention, each star wheel 54 is connected to the press section 8 for movement therewith. However, if desired, it is within the scope of this invention that each star wheel 54 can be independently mounted. Each star wheel 54 has a plurality of arms 56 extending therefrom in a radial direction. Each arm 56 comprises a trailing portion 58 having a surface 59 which extends in a plane generally parallel to the movement of the press sections 8 as indicated by the arrows 10 and which functions as the abutment against which the stub 26 of the mandrel 16 is positioned. The leading edge of each arm in the direction of rotation of the star wheel 54 is provided with a kick block 60 which functions to move the mandrel with the asbestos-cement pipe thereon from a position on the anvil roll 2 to the conveyor mechanism 62 over which the mandrel with the asbestos-cement pipe 18 formed thereon moves for further processing. As illustrated in FIGS. 1 and 4, the kick block 60 has a surface 64 which is at an inclined angle relative to the horizontal. The surface 64 is adapted to contact the stub shaft 26 of the mandrel 16 and to impart thereto a rotational movement. Also, the mandrel 16 is lifted off the felt 4 and the anvil roll 2 and moved in a generally linear direction by the surface 64 so as to move the mandrel with the asbestos-cement pipe thereon from the anvil roll 2 to the conveyor mechanism 62. It is this unique cooperation between the kick block 60 and the stub shaft 26 which functions to effect a clean separation of the stock between that on the felt and that on the mandrel. In FIG. 3, the general path of movement of the mandrel 16 with the asbestos-cement pipe 18 formed thereon is indicated by the dotted lines 66.

The oparation of the apparatus is best described in relationship to FIGS. 1-3, inclusive, which illustrated different positions of the mandrels during the formation of asbestos-cement pipe thereon. As illustrated in FIG. 3, the mandrel A is in position between the press rolls 12 and the anvil roll 2 and a layer of asbestos-cement from the wet-laid stock 6 carried by the felt 4 has been laminated thereon to form the pipe 18.

After a predetermined thickness of asbestos-cement has been laminated on the mandrel 16, each star wheel 54 is rotated by means 57 to a prekicking position, illustrated in dotted outline on FIG. 4 actuated by a tripping mechanism 59. This occurs immediately prior to the time when the asbestos-cement pipe on the mandrel has reached it final thickness. It is noted that FIGS. 1-3 illustrate only one side of the mechanism and this apparatus is duplicated at the other end of the mandrel 16. When the thickness of the asbestos-cement pipe 18 has reached the predetermined limit, a tripping mechanism 59 actuates the means 57 to move the press section 8 to a nonpipe forming position and also rotate each star wheel 54 so that the surfaces 64 contact the stub shafts 26 of the mandrel A and moves the mandrel A through a distance as illustrated by the dotted lines 66 in FIG. 3 which define a curvilinear path.

As the surfaces 60 of the star wheels contact the mandrel 16, they impart thereto a linear and a rotational movement so as to move the mandrel from the pipe forming position to a position on the conveyor 62. The surfaces 64 contact the stub shafts 26 so as to lift the mandrel A from the anvil roll 2 and impart a linear movement to the mandrel and at the same time to impart thereto a rotational movement. The combination of these movements effects a clean separation of the stock between that on the felt and that on the mandrel. The star blocks 54 continue to rotate until the stops 58 have reached a position with the surfaces 59 thereof spaced from the plane passing through the center of the press section 8 and the longitudinal axis of the anvil roll 2 a distance approximately equal to the radius of the stub shaft 26. The star blocks 54 are then secured in this position. As each of the star blocks 54 is rotating to the position illustrated in FIG. 1 with the stop 58 located between the press section 8 and the anvil roll 2, the indexing mechanism 28 is rotating until the mandrel B is positioned in the notches 40 of the pivoted members 38 as shown in FIGS. 1 and 3. After the mandrel B has been deposited in the notches 40 of the pivoted members 38, the pistons 48 are actuated so as to move the member 38 through an arc and deposit the mandrel B in position on the anvil roll 2 as illustrated in FIG. 2 with the stub shafts 26 next to the stops 58. The distance between each notch 40 and the pivot of each member 38 is less than the distance from the surface of the anvil roll 2 immediately below the press rolls 12 and the pivot for each member 38. Therefore, as the mandrel B moves to its position on the anvil roll 2, it is lifted from the notches 40 as the members 38 move toward the anvil roll 2. The movement of the members 38 is continued and the mandrel 13 is moved by the surfaces 52 until the stubs 26 of the mandrel B contact the stop member 58. The mandrel B is held in this position on the anvil roll 2 until the press section 8 lowers to a pipe forming position, indicated by the dotted lines of the press rolls 12 in FIG. 2, with the press rolls 12 in contact with the peripheral surface of the mandrel B. The pivoted members 38 then swing back through the action of the pistons 48 until they are in a position as shown in FIGS. 1 and 3. This sequence of steps is repeated so that the mandrels are progressively indexed and passed through the mechanism with a minimum of time between each operation. It is noted in FIGS. 1-3, inclusive, that each mandrel as it is picked from the rack 22 by the indexing mechanism 28 moves from the notch 32 over the surface 34 until it is positioned in the notch 36 as the indexing mechanism rotates.

In one embodiment of the apparatus disclosed in the instant application, the accumulation rack 22 was inclined at an angle of 4° to the horizontal so as to insure the gravity feed of the empty mandrels. The surface 64 of each kick block 60 was machined so as to have line contact with the associated stub shaft 26 and was set at an angle of 60° to the horizontal so as to give a simultaneous lifting, rotational and pushing movement to the mandrel. The star wheel 54 was operated sequentially in rotational increments of 1/3 of a revolution in sequences of prekicking position and after-kicking position. In the preferred embodiment of the invention, the star wheels rotate so as to contact the associated end of the mandrel as the press mechanism is moving to an out of pipe forming position. Therefore, since in the preferred embodiment of the invention, each star wheel is connected to the press section for movement therewith, the kick block 60 is moving in axial direction while being rotated to contact the stub shaft 26. Thus, in the preferred embodiment of the invention, there is even a more unique form of the lifting, rotational and pushing forces applied to the stub shafts 26 and the mandrel so as to effect a clean separation of the stock between that on the felt and that on the mandrel and to move the mandrel from the position on the anvil roll 2 to a position on the conveyor table 62.

While the invention has been described in rather full detail, it will be understood that these details need not be strictly adhered to and that various changes and modifications may suggest themselves to one skilled in the art, all falling within the scope of the invention as defined by the subjoined claims.

What I claim is:

1. Apparatus for forming asbestos-cement pipe wherein a continuous layer of asbestos-cement stock carried by a moving felt is wrapped around a mandrel to form a plurality of laminations thereon while said mandrel is supported on an anvil roll comprising:
    (a) means for positioning a mandrel on a anvil roll in the forming section of an asbestos-cement pipe forming machine,
    (b) means for forming a plurality of laminations of asbestos-cement stock on said mandrel from a continuous layer of asbestos cement stock carried by a moving felt,
    (c) a conveyor spaced a predetermined distance from said anvil roll to receive mandrels having a plurality of laminations of asbestos-cement stock thereon,
    (d) means for imparting a sufficient force to said mandrel with said laminations thereon while on said anvil roll to lift said mandrel from said anvil roll and to move said mandrel with said laminations thereon through said distance to deposit said mandrel on said conveyor,
    (e) said means for imparting said force also imparting a rotation to said mandrel with said laminations thereon, and
    (f) said combination of the lifting, moving, and rotating of said mandrel with said laminations thereon effecting a separation of said asbestos-cement stock between the stock remaining on said felt and the stock laminated on said mandrel.

2. Apparatus as defined in claim 1 wherein said means for imparting a force to said mandrel comprises:
    (a) a pair of cooperating blocks,
    (b) each of said blocks having a surface for contacting a portion of one of the free ends of said mandrel,
    (c) said surface when contacting said mandrel forming an acute angle with the plane passing through the longitudinal axis of said mandrel and the longitudinal axis of said anvil roll while said asbestos-cement stock is being laminated on said mandrel, and
    (d) means for moving each of said blocks into contact with said portion of said mandrel to impart said force thereto.

3. Apparatus as defined in claim 1 wherein said means for imparting a force to said mandrel comprises:
    (a) a pair of cooperating rotatable bases,
    (b) each of said bases having a plurality of projections thereon extending generally in a radial direction,
    (c) each of said projections having a surface for contacting a portion of one of the free ends of said mandrel,
    (d) said surface when contacting said mandrel forming an acute angle with the plane passing through the longitudinal axis of said mandrel and the longitudinal axis of said anvil roll while said asbestos-cement stock is being laminated on said mandrel, and
    (e) means for rotating said base to move each of said surfaces into contact with said portion of said mandrel to impart said force thereto.

4. Apparatus as defined in claim 3 wherein said means for positioning a mandrel on an anvil roll in the forming section of an asbestos-cement pipe forming machine comprises:
    (a) a rack having a plurality of mandrels thereon,
    (b) a pair of pivotally mounted arms, each having means adjacent an end thereof for supporting a free end of a mandrel,
    (c) means for sequentially depositing said mandrels on said pivoted arms,
    (d) stop means on each of said projections, and
    (e) means actuating said arms so as to deposit each of said mandrels at periodic intervals into position on said anvil roll and in contact with said stop means.

No references cited.

DONALL H. SYLVESTER, *Primary Examiner.*

S. L. BASHORE, *Assistant Examiner.*